United States Patent [19]

Eguchi

[11] Patent Number: 5,347,355
[45] Date of Patent: Sep. 13, 1994

[54] SIGNAL PROCESSING APPARATUS AND METHOD, AND DISPLACEMENT DETECTING APPARATUS USING THE SAME

[75] Inventor: Tadashi Eguchi, Kawasaki, Japan

[73] Assignee: Canon Kabushiki Kaisha, Tokyo, Japan

[21] Appl. No.: 5,576

[22] Filed: Jan. 19, 1993

[30] Foreign Application Priority Data

Jan. 21, 1992 [JP] Japan .................. 4-008469

[51] Int. Cl.$^5$ ............................................. G01B 11/02
[52] U.S. Cl. ............................... 356/356; 328/162; 328/165; 307/542; 356/345; 250/231.16
[58] Field of Search ............... 356/356, 357, 345, 358; 328/165, 162; 307/542; 250/231.16

[56] References Cited

U.S. PATENT DOCUMENTS 5,120,954  6/1992  Taniguichi .................. 250/231.16

FOREIGN PATENT DOCUMENTS 399219  4/1991  Japan .

Primary Examiner—Davis L. Willis
Assistant Examiner—LaCharles P. Keesee, III
Attorney, Agent, or Firm—Fitzpatrick, Cella, Harper & Scinto

[57] ABSTRACT

In a signal processing apparatus and method, original two-phase signals each having the possibility of amplitude fluctuation are received by an input portion. From the original two-phase signals received by the input portion, new two-phase signals are formed by a signal processing portion. The signal processing portion forms an intermediate stage two-phase signal and a phase component eliminated signal having the phase components of the original signals eliminated therefrom in parallel from the original two-phase signals, and eliminates the fluctuation component of amplitude by the offsetting process of respective ones of the two-phase signals and the phase component eliminated signal to thereby form the new two-phase signals. The new two-phase signals have a predetermined phase relation with the original two-phase signals. The new two-phase signals are output from an output portion. This specification also discloses a displacement detecting apparatus using such a signal processing apparatus.

10 Claims, 7 Drawing Sheets

SIGNAL PROCESSING APPARATUS AND METHOD, AND DISPLACEMENT DETECTING APPARATUS USING THE SAME

BACKGROUND OF THE INVENTION

1. Field of the Invention

This invention relates to signal processing for enhancing detection resolution on the basis of a periodic signal obtained in a displacement detecting apparatus such as an encoder or an interferometer.

2. Related Background Art

In an optical incremental type rotary encoder or linear encoder, the displacement or the direction of movement of a moving object is detected by the use of two sine wave signals differing in phase (two-phase sine wave signals, in other words, a sine wave signal and a cosine wave signal) obtained from light receiving means. There is known a technique of producing signals differing in phase from said sine wave signal and said cosine wave signal by a signal interpolating process and increasing the number of divided pulses to thereby enhance detection resolution.

FIG. 1 of the accompanying drawings is a construction diagram showing an example of the signal processing means, and FIG. 2 of the accompanying drawings shows signal waveforms in the various circuit portions of FIG. 1. In FIG. 1, the reference numerals 21 and 22 designate input terminals to which a sine wave signal S1 and a cosine wave signal C1 are input. That is, in contrast with a signal a (sine wave) from the input terminal 21, a signal b (cosine wave) having a phase difference of 90° is input from the input terminal 22. Also, a signal c given a phase difference of 180° with respect to the signal a is obtained in an inverting circuit 23. These three signals a, b and c are suitably weight-added by resistors R, and a sine wave signal of any phase (angle) is interpolated. In FIG. 1, all the resistors R are of the same value and signals d and e of phase differences 45° and 135°, respectively, are obtained.

These signals are converted into rectangular waves by four comparators 24, 25, 26 and 27, but usually the inputs of the comparators are given a hysteresis so that the comparators may not cause chattering by the influence of the noise at this time. A pulse circuit 28 constitutes means for obtaining rectangular wave signals of two phases having a phase difference of 90° therebetween. In this manner, signals of higher resolution can be obtained from the sine wave signal and cosine wave signal obtained from the light receiving means.

Also, discretely from this, an attempt has been made to provide an electrical interpolation method using a combination of an analog multiplier and said resistance division as shown in Japanese Laid-Open Patent Application No. 3-99219, or to output interpolation data in a memory with a value which is obtained by A/D-converting two-phase sine wave signals as an address, thereby obtaining high resolution.

However, the above-described technique of interpolating an original signal from the phase information of the two-phase sine wave signals of the displacement detecting apparatus such as the encoder or the laser interferometer and enhancing the resolution has suffered from the following problems.

Generally in the encoder or the interferometer, there is a case where the quantity of reflected light, the quantity of transmitted light or the interference state varies with the movement of an object to be measured, whereby the magnitude of the amplitude of a periodic signal obtained is varied. In such a case, the following inconveniences occur:

(1) When phase division is to be effected by the construction as shown in FIG. 1, if the amplitudes of the input signals S1 and C1 vary, the phase with which the rectangular wave is output will be varied by a hysteresis voltage as indicated by dotted lines in FIG. 2;

(2) When two-phase sine wave signals are to be directly A/D-converted, if the signals become small, the quantization error of the A/D converter will become unnegligible and division accuracy will be reduced; and (3) When as shown in the aforementioned Japanese Laid-Open Patent Application No. 3-99219, an attempt is made to enhance the resolution by the use of the analog multiplier, the amplitude of the output of the multiplier is proportional to the square of the amplitude of the two-phase sine wave of the original signal and therefore, if for example, the amplitude of the original signal becomes $\frac{1}{2}$, the output of the multiplier will become $\frac{1}{4}$ and the S/N ratio will be extremely reduced.

SUMMARY OF THE INVENTION

The present invention has been made to solve the above-noted problems and an object thereof is to provide a technique whereby even if a fluctuation occurs to the amplitude of a reference periodic signal input, signal processing for higher resolution can be effected highly accurately without being affected by the fluctuation.

Other objects of the present invention will become apparent from the following description of some embodiments of the present invention.

DETAILED DESCRIPTION OF THE PREFERRED EMBODIMENTS

A signal processing apparatus according to an embodiment which will hereinafter be described has means for inputting a sine wave signal and a cosine wave signal which become a reference, calculating means for creating a sine wave signal having a frequency a natural number times as high as the frequency of said reference signals, calculating means for creating a cosine wave signal having a frequency a natural number times as high as the frequency of said reference signals, and regulating means for regulating the amplitudes of said created sine wave signal and cosine wave signal having the frequency a natural number times as high as the frequency of said reference signals so as to become constant irrespective of the fluctuation of the amplitude of said reference signals.

Figure 1:
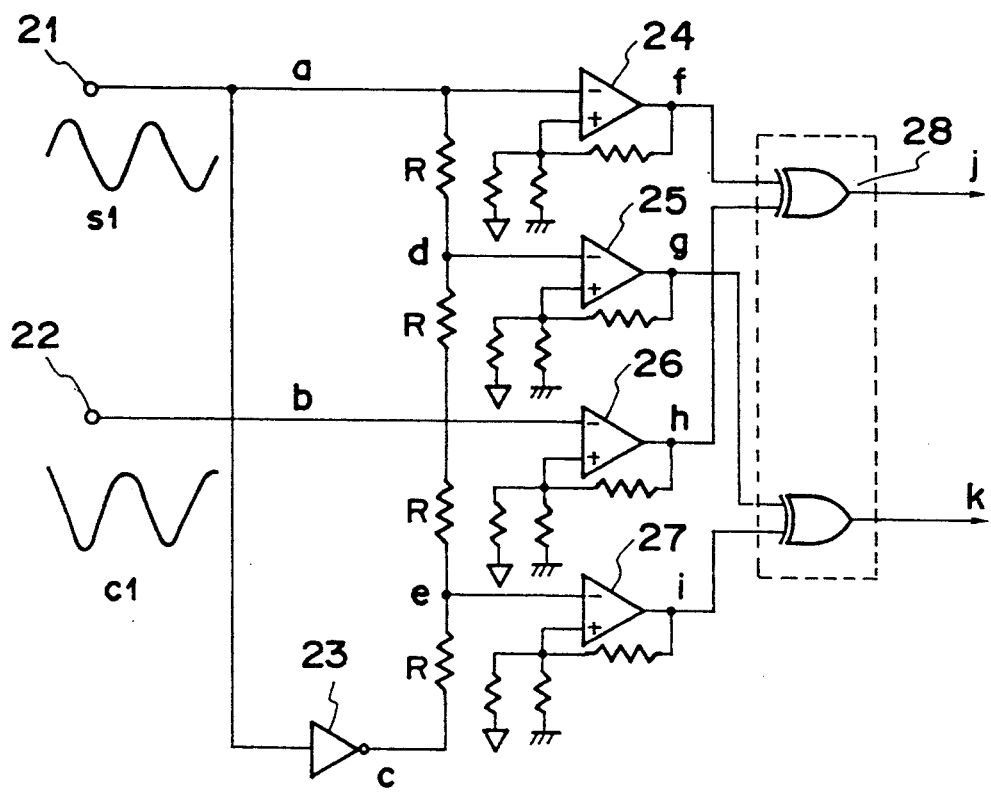
FIG. 1 is a construction diagram of a signal circuit according to the prior art.
Figure 2:
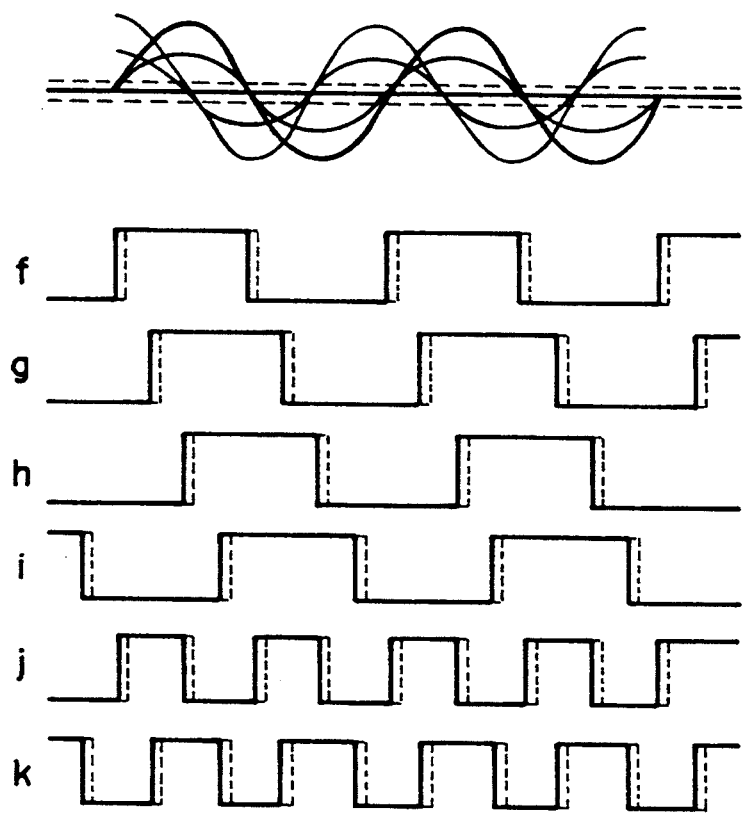
FIG. 2 shows signal waveforms in the circuit of FIG. 1.
Figure 3:
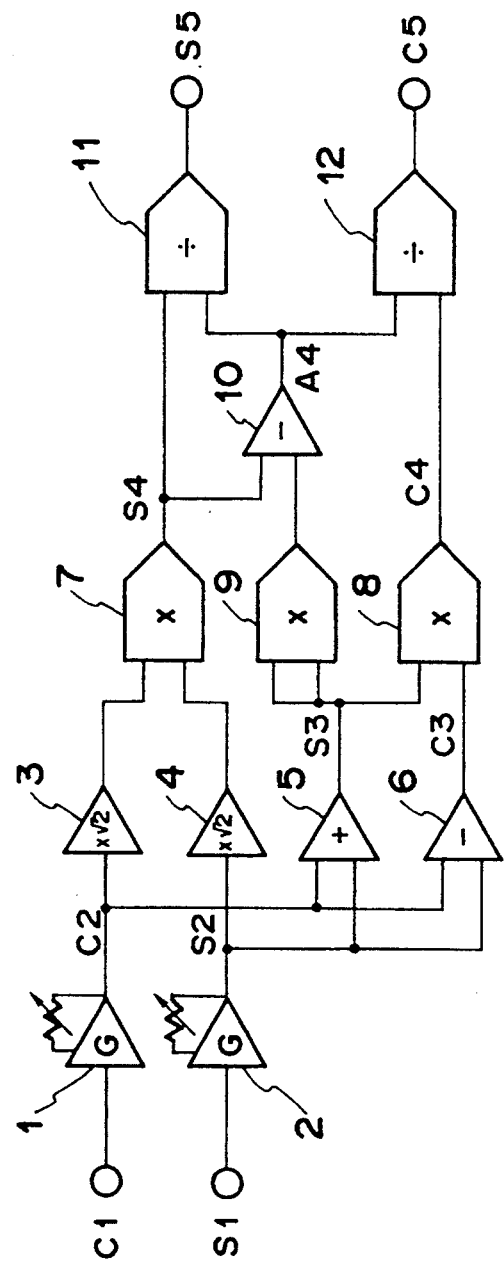
FIG. 3 is a construction diagram of a signal circuit according to an embodiment of the present invention.

The invention will hereinafter be described in detail with respect to some embodiments thereof shown in the drawings. FIG. 3 is a construction diagram of the signal processing apparatus of the displacement detecting apparatus of the present invention. The reference numerals 1 and 2 designate amplitude regulating means, the reference numerals 3 and 4 denote $\sqrt{2}$ time amplifiers, the reference numeral 5 designates an adder, the reference numerals 6 and 10 denote subtractors, the reference numerals 7, 8 and 9 designate Analog multipliers, and the reference numerals 11 and 12 denote dividers.

The amplitudes of periodic signals of two phases (sine wave and cosine wave) obtained in a displacement detecting mechanism or the like are not always coincident with each other in a state in which there is no fluctuation in the amplitudes, and two signals C1 and S1 input from input terminals are expressed by the following equations:

$$C1 = P_1 \cos\omega t \quad (1)$$

$$S1 = P_2 \sin\omega t \quad (2)$$

where $P_1$ and $P_2$ are the amplitudes of the two-phase sine waves.

The amplitude regulating means 1 and 2 regulate the amplification factors of the input two-phase sine waves C1 and C2, respectively, by variable resistors to thereby obtain two-phase sine wave signals C2 and S2 of the same amplitude P.

$$C2 = P\cos\omega t \quad (3)$$

$$S2 = P\sin\omega t \quad (4)$$

From these signals, a sum signal S3 and a difference signal C3 are produced by the adder 5 and the subtractor 6, respectively.

$$\begin{aligned} S3 &= P\cos\omega t + P\sin\omega t \\ &= \sqrt{2}\, P\sin(\omega t + \pi/4) \end{aligned} \quad (5)$$

$$\begin{aligned} C3 &= P\cos\omega t - P\sin\omega t \\ &= \sqrt{2}\, P\cos(\omega t + \pi/4) \end{aligned} \quad (6)$$

The multiplier 8 effects the multiplication of S3 and C3, and the output C4 thereof is $$\begin{aligned} C4 &= 2P^2 \sin(\omega t + \pi/4) \cdot \cos(\omega t + \pi/4) \\ &= P^2 \sin(2\omega t + \pi/2) \\ &= P^2 \cos 2\omega t. \end{aligned} \quad (7)$$

The multiplier 7 effects the multiplication of outputs obtained by amplifying C2 and S2 by the $\sqrt{2}$ time amplifiers 3 and 4, respectively, and the output S4 thereof is $$\begin{aligned} S4 &= 2P^2 \sin\omega t \cdot \cos\omega t \\ &= P^2 \sin 2\omega t. \end{aligned} \quad (8)$$

On the other hand, a signal A4 obtained by subtracting S4 from the square signal of S3 by the subtractor 10 is $$\begin{aligned} A4 &= (P\cos\omega t + P\sin\omega t)^2 - 2P^2 \sin\omega t \cdot \cos\omega t \\ &= P^2. \end{aligned} \quad (9)$$

Outputs S5 and C5 obtained by dividing S4 and C4 by A4 by the use of the dividers 11 and 12, respectively, are $$C5 = \cos 2\omega t \quad (10)$$

$$S5 = \sin 2\omega t \quad (11)$$

As will be seen from equations (10) and (11), even if the amplitude of the original signal varies and the amplitude P of the two-phase sine wave signals C2 and S2 varies, it will not affect the finally obtained periodic signals C5 and S5 of double frequency.

Figure 4:
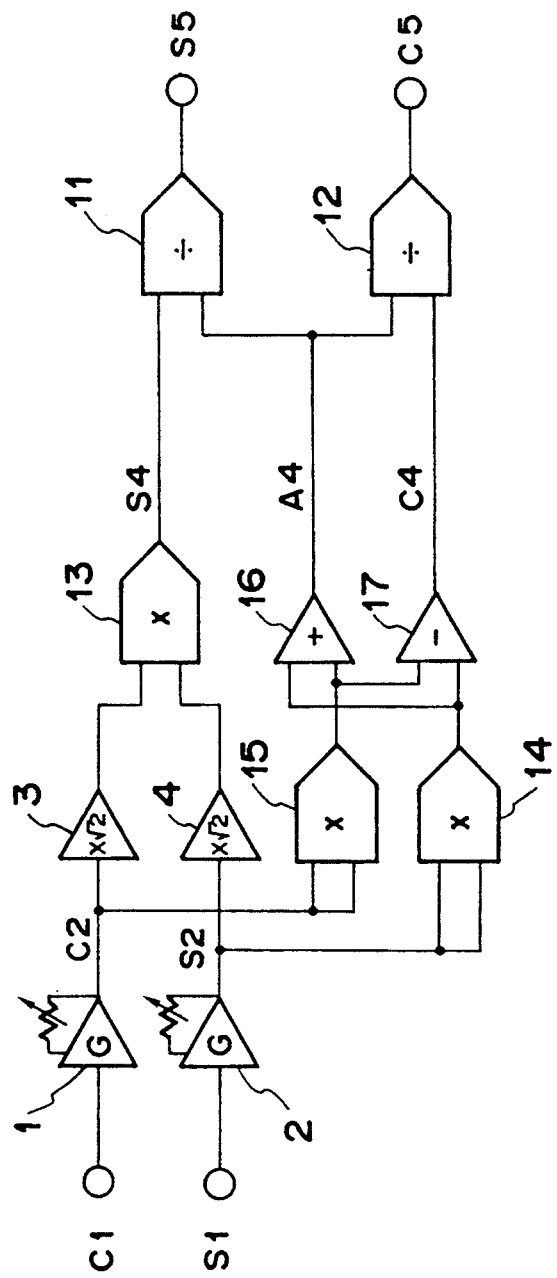
FIG. 4 is a construction diagram of a signal circuit according to another embodiment of the present invention.

The above-described circuit construction is not restrictive, but other forms are also conceivable. FIG. 4 shows a modification of the above-described construction, and in FIG. 4, the same reference numerals as those in FIG. 3 designate the same members. The reference numerals 13, 14 and 15 denote analog multipliers, the reference numeral 16 designates an adder, and the reference numeral 17 denotes a subtractor. In the construction of FIG. 4, as compared with the construction of FIG. 3, the calculating method for obtaining the signals A4 and C4 differs, but the signals obtained are identical and therefore, the same operational effect as that of the embodiment of FIG. 3 is obtained.

Also, if the phase delay by the amplifier poses no problem, one of the $\sqrt{2}$ time amplifiers 3 and 4 may be omitted and the other may be replaced by a two-time amplifier.

The above-described/processing procedure may be summed up as follows.

(1) The square signal A4 of the amplitude of the input sine wave signal S2 and cosine wave signal C2 is obtained by the use of the analog multiplier, the adder or the like. This square signal includes the fluctuation information of the amplitude of the reference signal. The phase component is eliminated.

(2) The signals S4 and C4 of a frequency (resolution) double the frequency of the reference signal are obtained by the use of the analog multipliers.

(3) The sine wave signal S4 and cosine wave signal C4 of double frequency are each divided by said square signal A4 by the use of the dividers to thereby offset the fluctuations of the amplitudes and create the sine wave signal S5 and cosine wave signal C5 of which the frequency is constantly double.

As described above, the output of the circuit of the present construction is not affected by the fluctuation of the amplitude of the input signal, and this leads to the following advantages when this output signal is electrically interpolated as a two-phase sine wave signal:

(1) When the two-phase sine wave signal is read in by the A/D converter, any reduction in interpolation accuracy by the quantization error of the A/D converter can be prevented;

(2) In the case of a system in which the two-phase sine wave signal is read in by the A/D converter and with the data thereof as addresses, the phase information in a memory is called out, the amplitude is constant and therefore, the addresses may be few, that is, the capacity of the memory may be small;

(3) When phase division is effected, any extreme reduction in S/N ratio does not occur in spite of the multiplier being used;

(4) Even if use is made of the analog multiplier as shown in Japanese Laid-Open Patent Application No. 3-99219, little or no reduction in S/N ratio occurs; and (5) The two-phase signals S4 and C4 at the intermediate stage and the signal A4 from which the phase component has been eliminated are formed in parallel and by the division of these, the final two-phase signal is formed and therefore, the follow-up delay or the like as when feedback or the like is effected does not occur.

Figure 5:
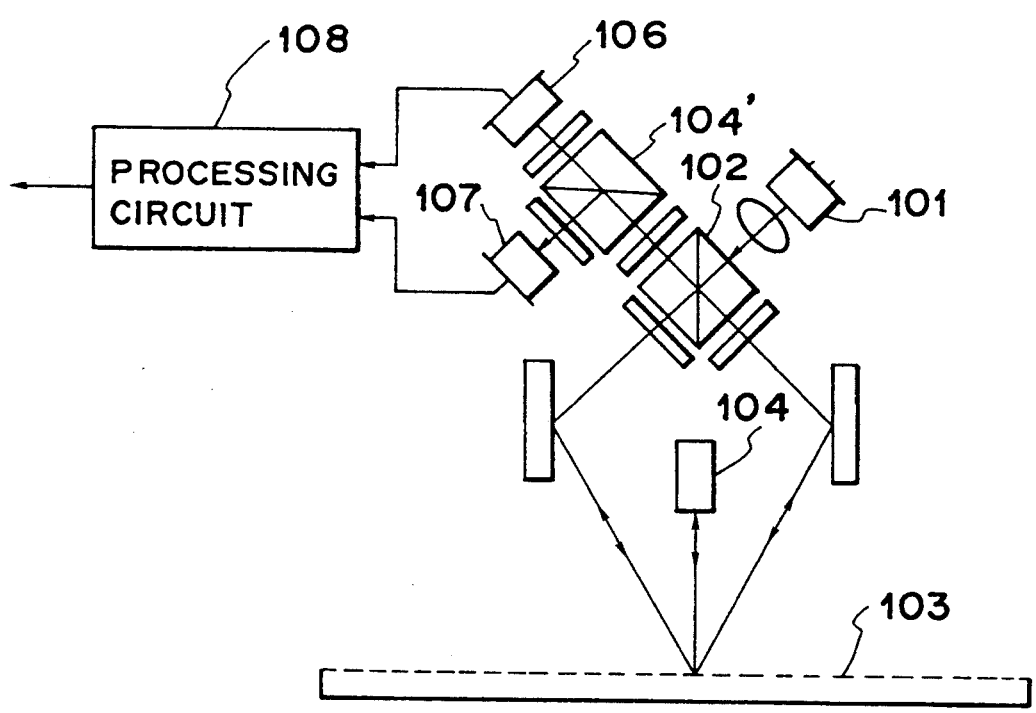
FIG. 5 is a construction diagram of an encoder using the principle of light interference.

Now, the signal processing circuit has been described above, and this signal processing circuit may preferably be used in an apparatus such as a displacement detecting apparatus or a laser length measuring machine. As an example, the construction of a displacement detecting apparatus such as a linear encoder or a rotary encoder having the above-described signal processing circuit is shown in FIG. 5.

A light beam emitted from a coherent light source 101 such as a semiconductor laser is split into two light beams by a beam splitter 102, and the two light beams are incident on a single-point position on a diffraction grating 103 which is a movement amount measuring slit formed on a movable scale plate or a rotatable disk plate. High-order diffracted lights created from the diffraction grating 103 toward a reflecting optical system 104 by the incidence of the light beams, here ±1st-order diffracted lights, are both reflected by the reflecting optical system 104 and are again incident on substantially the same position on the diffraction grating 103. The reflecting optical system 104 forms a so-called cat's eye optical system. ±1st-order re-diffracted lights created there by the re-incidence return along substantially the same optical path as that during the incidence. Interference lights formed by these ±1st-order re-diffracted lights are made into periodic signals of two phases having a phase difference of 90° therebetween by a polarizing beam splitter 104' and a deflecting plate and are detected by photodetectors 106 and 107, respectively. As regards sine and cosine detection signals obtained by these photodetectors 106 and 107, harmonic signals are produced to enhance detection resolution by a processing circuit 108 having the signal processing circuit shown in FIG. 3 or 4, and the zero cross point of the waveforms of the created signals is detected to thereby obtain divided pulses, which are output as detection pulses conforming to the displacement of the diffraction grating. Thus, a number of detection pulses conforming to the amount of displacement (the amount of movement or the amount of rotation) of the diffraction grating relative to the incident light beam are output from the output terminal of the processing circuit 108. Further, the direction of rotation or the direction of movement is also detected by the utilization of the phase difference between the two signals.

Figure 6:
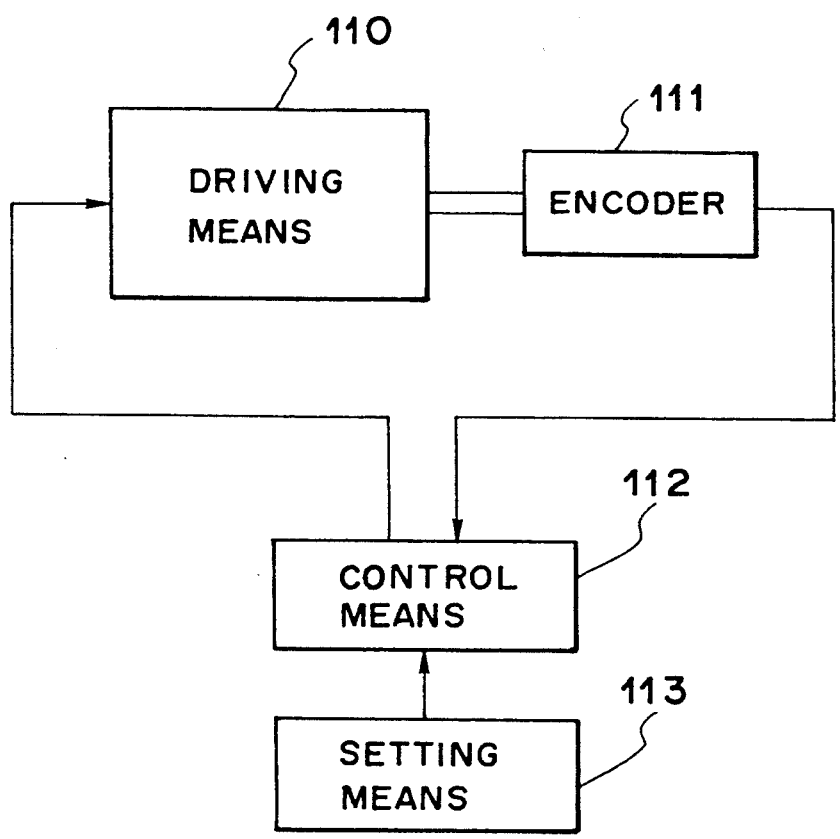
FIG. 6 is a construction diagram of a driving system having the encoder.

FIG. 6 shows an example of the use of the above-described encoder, and is a system construction diagram of a driving system using the encoder. An encoder unit 111 is connected to the driving output portion of driving means 110 having a drive source such as a motor, an actuator or an engine, or to a moving portion for an object driven, and detects the driven state such as the amount and speed of rotation or the amount and speed of movement. This encoder unit has the signal processing circuit described in connection with FIG. 3 or 4. The detection output from the encoder unit 111 is fed back to control means 112, and a driving signal is transmitted to the driving means 110 so that a condition set by setting means 113 may be brought about in the control means 112. By such a feedback system being constituted, the driving condition set by the setting means 113 can be kept. Such a driving system can be widely applied to a business machine such as a typewriter, a printer, a copying machine or a facsimile apparatus, a video instrument such as a camera or a video recorder, a recording apparatus, a robot, a machine tool, a manufacturing apparatus and further, any apparatus having driving means.

Figure 7:
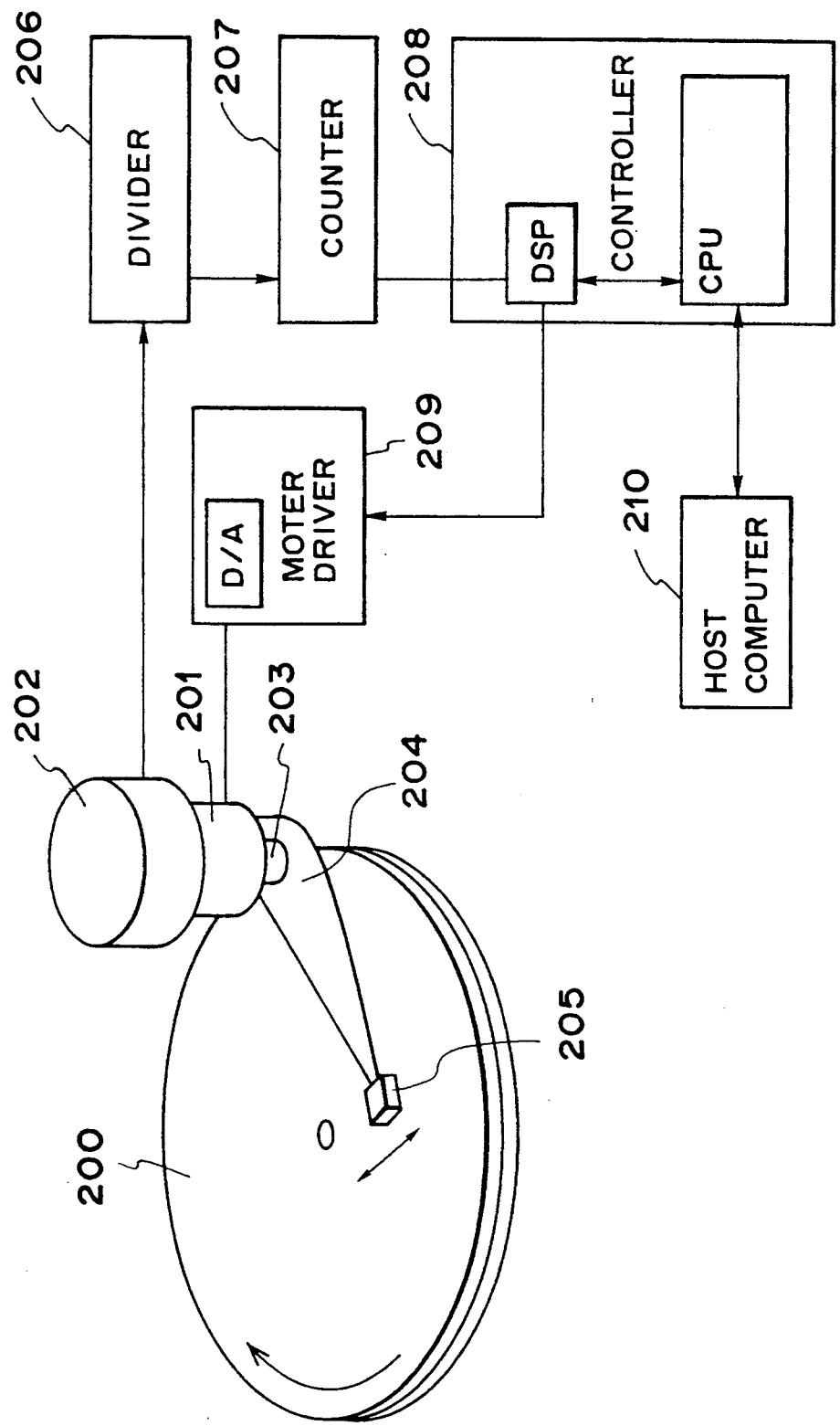
FIG. 7 is a construction diagram of a servo-writer system for a hard disk.

FIG. 7 shows a specific example using such a driving system, and particularly shows the general construction of the servo-writer system of a hard disk. In FIG. 7, the reference numeral 200 designates the surface of a magnetic disk rotated by driving means, not shown, the reference numeral 201 denotes a motor such as a stepping motor capable of highly accurate rotation, the reference numeral 203 designates the motor shaft of the motor 201, the reference numeral 204 denotes an arm portion directly mounted on the motor shaft 203, and the reference numeral 205 designates a track signal writing head attached to the tip end of the arm portion 204. With such a construction, the writing head 205 is moved diametrically on the surface 200 of the magnetic disk by the rotation of the motor 201. The reference numeral 202 denotes the rotary encoder described above. The rotary encoder 202 is mounted on the rotary shaft of the motor 201 and detects the amount of rotation of the motor 201.

On the other hand, the reference numeral 206 designates a divider having the signal processing circuit described in connection with FIG. 3 or 4. The divider 206 electrically divides the detection output of the encoder 202 and enhances the detection resolving power. The reference numeral 207 denotes a counter for counting the detection pulses from the divider 206. The reference numeral 208 designates a controller for synthetically controlling the system. The controller 208 has a CPU, a DSP, etc. The reference numeral 209 denotes a motor driver for driving the motor 201 on the basis of the command of the controller 208. The motor driver 209 has a D/A converter, etc. The reference numeral 210 designates a host computer for setting the operation of the system.

The controller 208, on the basis of the detection by the encoder obtained from the counter 207, gives a command to the motor driver 209 so that the operation of the system may become the operation as set by the host computer 210, and the motor driver 209 drives the motor 201 to thereby move the writing head 205 attached to the tip end of the arm portion 204 diametrically on the surface 200 of the magnetic disk and accurately shifts it to a predetermined track position. On the basis of a signal from a circuit, not shown, the writing head 205 writes a track signal onto the surface 200 of the magnetic disk.

According to the present invention, even if any fluctuation of the amplitude of the input reference signal occurs, the signal processing for higher resolution can be effected without being affected by it.

What is claimed is:

1. A signal processing apparatus, comprising:
an input portion for receiving original two-phase signals each having a possibility of amplitude fluctuation;
a signal processing portion for forming new two-phase signals from the original two-phase signals received by said input portion, said signal processing portion forming intermediate stage two-phase signals and a phase component eliminated signal having the phase components of said original signals eliminated therefrom in parallel from said original two-phase signals, and eliminating the fluctuation component of amplitude by the offsetting process of respective ones of said intermediate stage two-phase signals and said phase component eliminated signal to thereby form said new two-phase signals, said new two-phase signals having a predetermined phase relation with said original two-phase signals; and an output portion for outputting said new two-phase signals.

2. A signal processing apparatus according to claim 1, wherein said signal processing portion has a first circuit for regulating the amplitudes of said original two-phase signals and forming two-phase signals of the same amplitude, a second circuit for forming the sum signal of and the difference signal between said two-phase signals of the same amplitude, a third circuit for forming the multiplied signal of said sum signal and said difference signal as a first signal of said intermediate stage two-phase signal, a fourth circuit for forming the multiplied signal of amplified signals $\sqrt{2}$ times as great as respective ones of said sum signal and said difference signal as a second signal of said intermediate stage two-phase signal, a fifth circuit for forming the difference signal between said second signal and the square signal of said sum signal as said phase component eliminated signal, and a sixth circuit for dividing said first signal and said second signal by said phase component eliminated signal and forming said new two-phase signals.

3. A signal processing apparatus according to claim 1, wherein said signal processing portion has first means for forming from said original two-phase signals a phase signal of a frequency double the frequency of one of said original two-phase signals, second means for forming from said original two-phase signals a phase signal of a frequency double the frequency of the other of said original two-phase signal, third means for forming said phase component eliminated signal from said original two-phase signals, and fourth means for dividing said phase component eliminated signal by said two phase signals to thereby form said new two-phase signals.

4. A signal processing method, comprising steps for:
the reception of original two-phase signals each having the possibility of amplitude fluctuation;
the formation of new two-phase signals from said received original two-phase signals, the formation of said new two-phase signals being executed by the parallel formation of intermediate stage two-phase signals and a phase component eliminated signal having the phase components of said original signals eliminated therefrom from said original two-phase signals, and the eliminating process of the fluctuation component of amplitude by the offsetting process of respective ones of said intermediate stage two-phase signals and said phase component eliminated signal, said new two-phase signals having a predetermined phase relation with said original two-phase signals; and
the output of said new two-phase signals.

5. A signal processing method according to claim 4, wherein the formation of said new two-phase signals comprises:
the first step of regulating the amplitudes of said original two-phase signals and forming two-phase signals of the same amplitude;

the second step of forming the sum signal of and the difference signal between said two-phase signals of the same amplitude;
the third step of forming the multiplied signal of said sum signal and said difference signal as a first signal of said intermediate stage two-phase signal;
the fourth step of forming the multiplied signal of amplified signals $\sqrt{2}$ times as great as respective ones of said sum signal and said difference signal as a second signal of said intermediate stage two-phase signal;
the fifth step of forming the difference signal between said second signal and the square signal of said sum signal as said phase component eliminated signal; and
the sixth step of dividing said first signal and said second signal by said phase component eliminated signal and forming said new two-phase signals.

6. A signal processing method according to claim 5, wherein the formation of said new two-phase signals comprises:
the step of forming from said original two-phase signals a phase signal of a frequency double the frequency of one of said original two-phase signals;
the step of forming from said original two-phase signals a phase signal of a frequency double the frequency of the other of said original two-phase signals;
the step of forming said phase component eliminated signal from said original two-phase signals; and
the step of dividing said phase component eliminated signal by said two-phase signals to thereby form said new two-phase signals.

7. A displacement detecting apparatus, comprising:
a sensor portion for outputting the displacement of a movable portion as two-phase signals corresponding to said displacement; and
a signal processing portion for forming new two-phase signals from the two-phase signals from said sensor portion, said signal processing portion forming intermediate stage two-phase signals from the two-phase signals from said sensor portion and a signal having the phase component of an original signal eliminated therefrom in parallel, and dividing respective ones of said intermediate stage two-phase signals and said phase component eliminated signal to thereby eliminate the fluctuation component of amplitude and form said new two-phase signals, said new two-phase signals having a predetermined phase relation with the two-phase signals from said sensor portion,
the displacement information of said movable portion being detected by said new two-phase signals.

8. A displacement detecting apparatus according to claim 7, wherein said sensor portion comprises a grating interferometer.

9. A displacement detecting apparatus according to claim 8, wherein said grating interferometer is provided on a motor, and the amount of rotation of said motor as the displacement information is detected by said new two-phase signals.

10. A displacement detecting apparatus according to claim 7, further comprising control means for controlling the displacement of said movable portion.

* * * * *

UNITED STATES PATENT AND TRADEMARK OFFICE
CERTIFICATE OF CORRECTION

PATENT NO. : 5,347,355
DATED : September 13, 1994
INVENTOR(S) : Tadashi EGUCHI

It is certified that error appears in the above-indentified patent and that said Letters Patent is hereby corrected as shown below:

ON THE COVER PAGE:

UNDER "U.S. PATENT DOCUMENTS":

"Taniguichi" should read --Taniguchi--.

UNDER "FOREIGN PATENT DOCUMENTS":

"399219 4/1991 Japan" should read
--3-99219 4/1991 Japan--.

IN THE DISCLOSURE:

COLUMN 3:

Line 10, "Analog" should read --analog--.

Signed and Sealed this

Twenty-first Day of February, 1995

Attest:

BRUCE LEHMAN

Attesting Officer    Commissioner of Patents and Trademarks